(No Model.)
H. J. RICHTER.
WAGON.
No. 461,085. Patented Oct. 13, 1891.
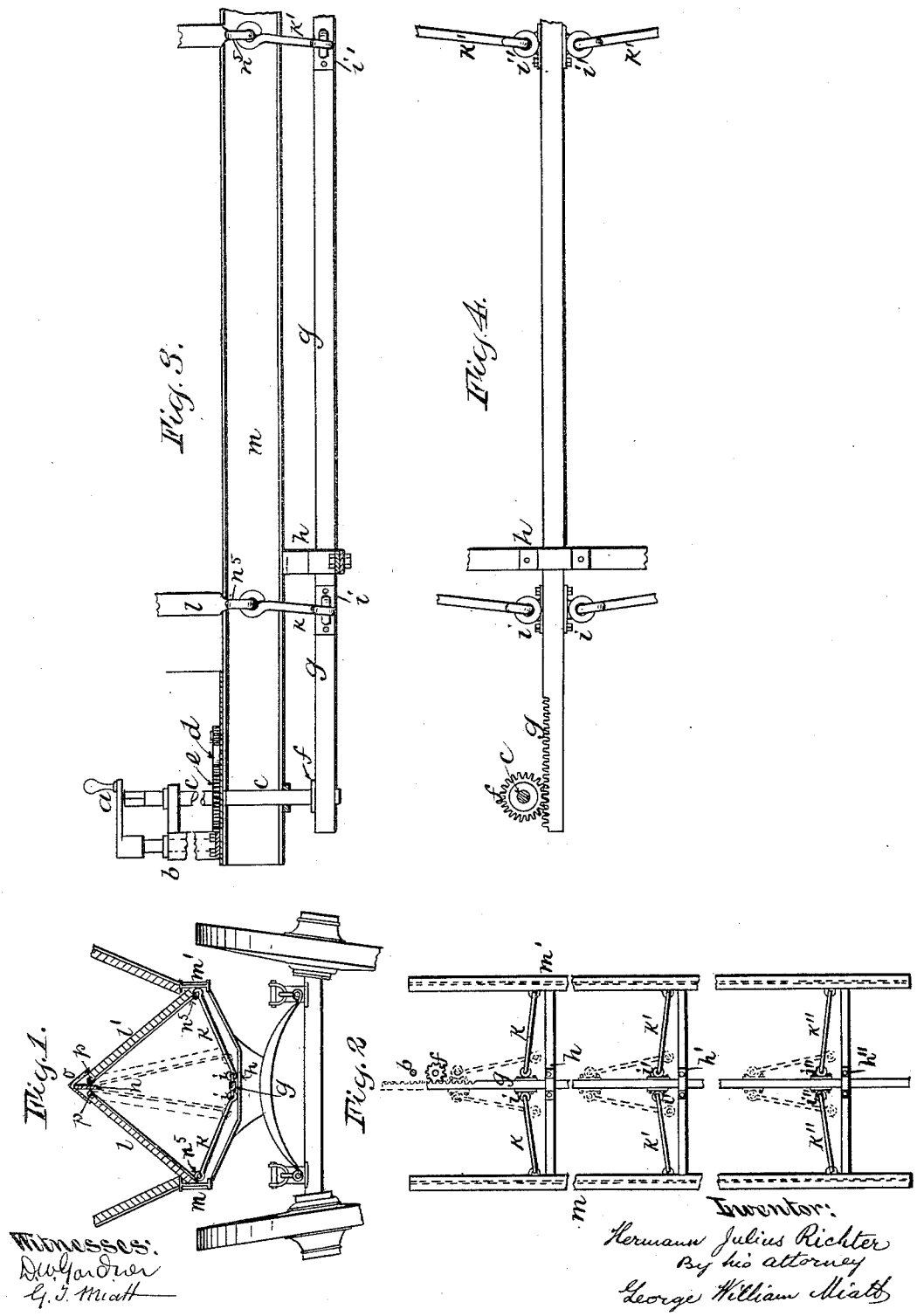
Witnesses:
D. W. Gardner
G. J. Miatt
Inventor:
Hermann Julius Richter
By his attorney
George William Miatt

000
UNITED STATES PATENT OFFICE.

HERMANN JULIUS RICHTER, OF DRESDEN, GERMANY, ASSIGNOR TO MORITZ WACKERNAGEL.

WAGON.

SPECIFICATION forming part of Letters Patent No. 461,085, dated October 13, 1891.

Application filed June 29, 1891. Serial No. 397,762. (No model.) Patented in Germany March 18, 1888, No. 45,319.

*To all whom it may concern:*

Be it known that I, HERMANN JULIUS RICHTER, a subject of the Emperor of Germany, residing at Dresden, Saxony, Germany, have invented certain new and useful Improvements in Wagons, (for which I have obtained a patent in Germany, No. 45,319, bearing date March 18, 1888,) of which the following is a specification, sufficient to enable others skilled in the art to which the invention appertains to make and use the same.

My improvements relate to the means employed for opening and closing the bottom of the wagon; and they consist in the special construction and arrangement of parts hereinafter described and claimed.

In the accompanying drawings, Figure 1 is a sectional elevation of a wagon-body provided with my improvements; Fig. 2, a diagrammatic plan of portions thereof; Fig. 3, a central longitudinal elevation within the frame of the wagon; Fig. 4, a plan of the front end of the draw-rod and connections.

Mounted upon the frame-work of the wagon, at its front end, is the brake mechanism $b$, which is operated by the crank $a$. This brake mechanism forms no part of my invention.

Immediately behind the brake mechanism $b$ is mounted the vertical shaft $c$, at the lower end of which is the pinion $f$, which engages with the rack-sliding bar $g$. The shaft $c$ is also provided with a ratchet-wheel $e$, which engages with the pawl $d$, so that the operator may control the opening or closing of the bottom of the wagon. The sliding bar $g$ nearly extends the full length of the wagon and is mounted upon bearings $h\ h'\ h''$, which are connected to the side I-beams $m\ m'$ and constitute the frame-work of the wagon.

Mounted on the sliding bar $g$ are eyes or hinges $i\ i'\ i''$, to which are connected the ends of the links $k\ k'\ k''$, the other ends of said links being connected, as at $n^5$, to the inclined bottom sections $l\ l'$ of the wagon. The inclined bottom is made in two sections $l\ l'$ and hung on longitudinal hinges $p\ p$, which are attached to the rib or rail $n$, extending the whole length of the wagon-body, so that when the sliding rod $g$ is moved forward the sections will assume the position shown in dotted lines in Fig. 1. A hood or cover $o$ is provided, so as to protect the hinges $p\ p$ from injury or from contact with dirt and other foreign substances.

As will be seen by reference to Fig. 2 of the drawings, when the sliding bar $g$ is moved forward the links $k\ k'\ k''$, connected to the bottom $l\ l'$, draw them toward the center, as shown in dotted lines in Fig. 1, practically leaving a clear space for the discharge of the cargo, &c.

To close the bottom of the wagon, the operator reverses or retracts the bar $g$ by means of the crank $a$ and shaft $c$. Thus it will be seen that very little energy or power is required to open or close the bottom.

What I claim as my invention, and desire to secure by Letters Patent, is—

1. In a wagon substantially such as described, the combination of the hinged central bottom sections $l\ l'$, the links $k\ k'\ k''$, sliding rack $g$, pinion $f$, shaft $c$, and a crank $a$, the whole arranged and operating substantially in the manner and for the purpose described.

2. In a wagon substantially such as described, the combination of the hinged central bottom sections $l\ l'$, the links $k\ k'\ k''$, sliding rack $g$, pinion $f$, shaft $c$, ratchet-wheel $e$, pawl $d$, and the actuating-crank $a$, the whole arranged and operating substantially in the manner and for the purpose described.

HERMANN JULIUS RICHTER.

Witnesses:
    FRIEDRICH GOSCH,
    HEINRICH BRUNO WACKERNAGEL.